US005208908A

United States Patent [19]

Harrison et al.

[11] Patent Number: 5,208,908

[45] Date of Patent: May 4, 1993

[54] DISPLAY SYSTEM HAVING A FONT CACHE FOR THE TEMPORARY STORAGE OF FONT DATA

[75] Inventors: Roy B. Harrison, East Wellow; David C. Haigh, Winchester; Roger T. Wood, Romsey, all of England

[73] Assignee: International Business Machines Corporation, Armonk, N.Y.

[21] Appl. No.: 485,347

[22] Filed: Feb. 26, 1990

[30] Foreign Application Priority Data

Oct. 12, 1989 [EP] European Pat. Off. ........... 89310458

[51] Int. Cl.$^{5}$ .............................................. G06F 15/20

[52] U.S. Cl. ..................................... 395/150; 395/164

[58] Field of Search ............... 395/150, 151, 162, 164, 395/165; 340/720, 721, 723, 724, 735, 750

[56] References Cited

U.S. PATENT DOCUMENTS 4,486,856 12/1984 Heckel et al. ........................ 364/900

FOREIGN PATENT DOCUMENTS 0123896 11/1984 European Pat. Off. .

0284260 9/1988 European Pat. Off. .

0284904 10/1988 European Pat. Off. .

*Primary Examiner*—Heather R. Herndon

*Attorney, Agent, or Firm*—Martin J. McKinley

[57] ABSTRACT

A display system has, in addition to a display memory for the main storage of display information for a character mode, a separate cache for the temporary storage of the definitions of one or more fonts currently required for display and control logic for updating the font cache from the display memory. This enables the efficient support of a character mode on a display system, particularly where the display memory of that system is implemented with dual-ported memory technology. Compatibility with existing display standards is achieved.

14 Claims, 3 Drawing Sheets

DISPLAY SYSTEM HAVING A FONT CACHE FOR THE TEMPORARY STORAGE OF FONT DATA

TECHNICAL FIELD

The invention relates to a display system comprising a display memory for the storage of information for display on a display device.

BACKGROUND ART

Many computer display systems in use today have both an all points addressable (APA) display mode and an alpha-numeric, or character, display mode. The APA display modes are increasingly important as they allow text, graphics and image data to be displayed. Character display modes (i.e. using fixed-size character boxes) while becoming less important, have advantages over APA modes in certain circumstances (e.g. for operating system messages) because they intrinsically have less demand for storage. Added to this character display modes remain necessary for reasons of compatibility with the large number of alpha-numeric applications already existing.

As APA display modes are currently seen as the most effective way of managing the display of computer generated information, a lot of development effort has been put into finding ways to improve the performance of these modes. With this in mind, it has been suggested that dual-ported display memory (in particular dual-ported video memory which is otherwise known as VRAM) should be used for the storage of data for display. A VRAM is a particular form of dynamic RAM (or DRAM) which, in addition to the usual DRAM random access mode, has a serial access mode in which data can be output sequentially at high speed in, for example an eight bit wide data stream. This fast serial access to data stored in a VRAM means that high video rate monitors can be supported. However the use of this technology poses a problem when a display system also has to provide a character mode, as the VRAM can only be accessed rapidly if the data stored in the memory is accessed sequentially. In a character mode, although the accessing of the character code and attribute information is sequential, the accessing of the font memory is not, and thus the font cannot be usefully stored in the VRAM. This problem is compounded in that prior display adapter standards such as the IBM Extended Graphics Array (EGA) and the IBM Video Graphics Array (e.g. VGA) which were based on DRAM technology, allowed a large number of fonts to be stored in their display memory, of which only a limited number could be displayed on a display device at any one time.

In a prior graphics standard (the IBM MCGA), a small static store, separate from the display memory was used for the storage of character fonts. However, only two character fonts could be displayed (both of these being held in the static RAM) with the result that MCGA adapters are incompatible with the EGA and VGA standards which require that more fonts can be dealt with.

European patent application EP-A-284,904 relates to a display system with a symbol font memory in which a selection of symbol fonts are stored in the system memory of a workstation and only those portions of a symbol font which are currently needed for display are transferred to the display memory of a display system. In this way part of the APA display memory is configured as a cache. This prior display system addresses the system overhead incurred in updating the display memory from the system memory of the workstation, but does not address the problem the instant invention seeks to solve, namely the efficient support of character modes in a display system comprising a dual-ported display memory. Indeed, the invention to which EP-A-284,904 relates is illustrated by two examples, both of which are based on prior display adapter standards which use DRAM technology; namely the Colour Graphics Adapter (CGA) and the Extended Graphics Array (EGA). It should be noted that that the term "character font" as used herein is intended to be synonymous with the term "symbol font" used in EP-A-284,904.

SUMMARY OF THE INVENTION

An object of the invention is to provide a display system having a dual-ported display memory for the storage of information to be displayed, which display system can efficiently support a character display mode.

In accordance with the invention, a display system comprises a display memory for the storage of information for display on a display device, said information including character font definitions, a font cache for the temporary storage of the definitions of one or more character fonts currently required for display and control logic for updating the font cache from the display memory.

Thus the invention provides in addition to a display memory, a separate font cache for the temporary storage of currently displayable character (or symbol) fonts. For a character display mode, the information for display comprises character codes, character attributes and font definitions for a plurality of different fonts. Typically, the font definitions will define a large number of different fonts. In a display system in accordance with the invention, this information for display is stored in the display memory. Especially in the case where the display system also supports an APA mode, there will be a relatively large amount of storage which is needed for on-screen storage in the APA mode, but which is available for off-screen storage in the character mode. The on-screen storage requirements are much higher in an APA mode.

It should be noted that although the primary object of the invention is to enable a character mode to be efficiently supported on a display system having a dual-ported display memory for the storage of information to be displayed, the invention would also be applicable to display systems with display memories implemented in other memory technologies.

The font cache is preferably in the form of high-speed static storage. As only selected font information is held in the font cache at any one time, it may be relatively small. Preferably, in order to achieve compatibility with existing display standards (e.g. EGA, VGA) two fonts are displayable at any one time.

In use, during active scan time the character codes and attributes are accessed sequentially from the VRAM and are passed to a serialiser which uses the character codes to access the appropriate font information from the cache. The serialiser then uses the font information from the font cache with the attribute information for creating appropriate video signals to drive the monitor.

During the vertical retrace period of the display, however, neither the VRAM nor the font RAM are accessed for the display purposes. During this time therefore, the information defining the currently displayable fonts can be accessed sequentially from the VRAM and written into the cache. The contents of the cache can thus be updated during successive vertical refresh times from the fonts stored in the VRAM. Any individual change caused by the system writing to the font area in VRAM or changing the fonts currently selected for display is reflected in the font cache within a few vertical scan periods.

BRIEF DESCRIPTION OF THE DRAWINGS

A particular example of a display system in accordance with the present invention will be described hereinafter with reference to the accompanying drawings in which.

DESCRIPTION OF THE PREFERRED EMBODIMENT

Figure 1:
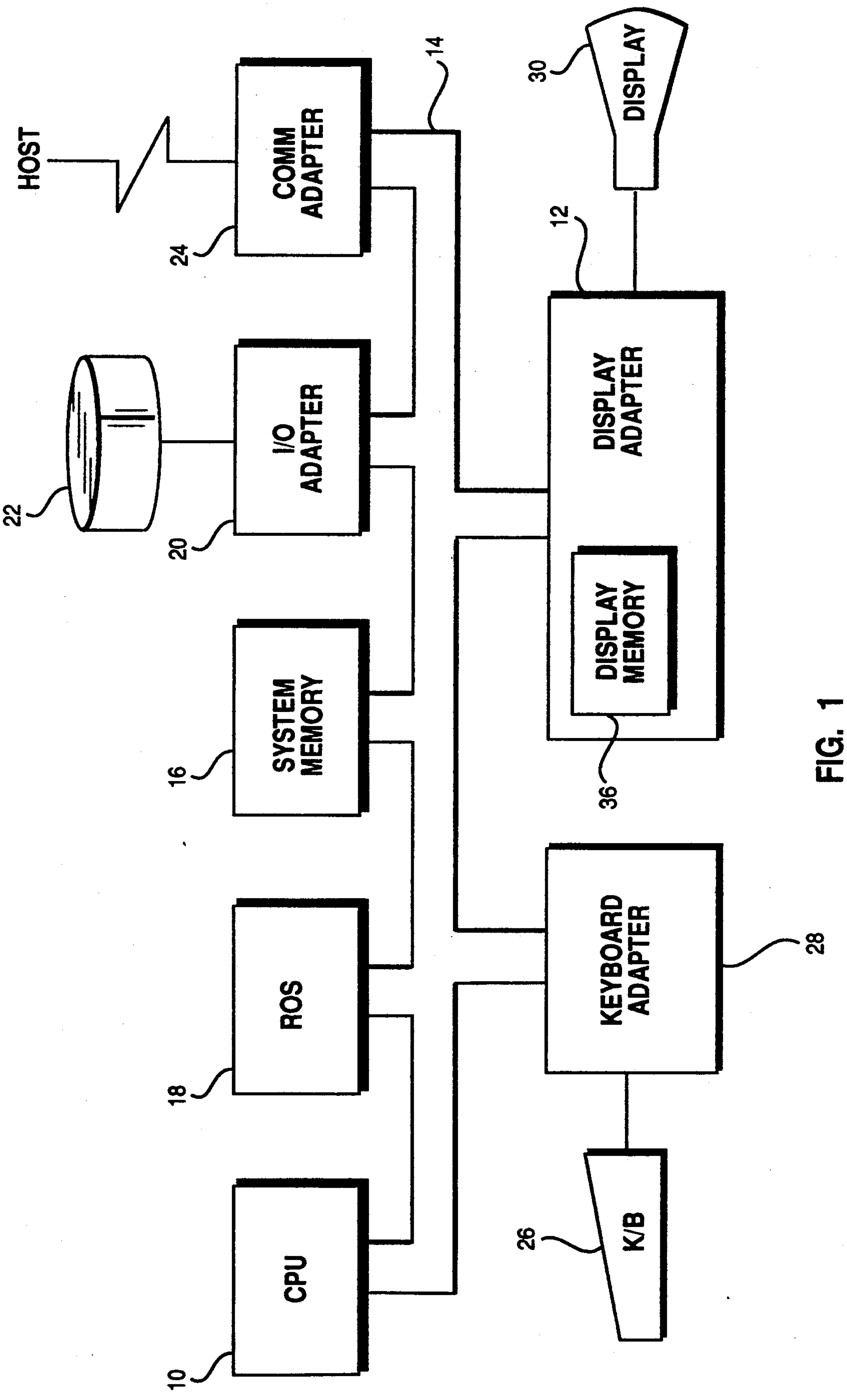
FIG. 1 is a generalised block diagram illustrating a typical configuration of a personal computer.

FIG. 1 is a schematic block diagram of a typical configuration of a workstation in the form of personal computer such as one of the members of the range of IBM PS/2 (trademark of International Business Machines Corporation) personal computers. The heart of the workstation is a conventional microprocessor 10. This is connected to a number of other units including a display adapter 12 via a system bus 14. Also connected to the system bus are a random access memory RAM 16 and a read only store 18. An I/O adapter 20 is provided for connecting the system bus to the peripheral devices 22 such as disk units. Similarly, a communications adapter 24 is provided for connecting the workstation to a remote processor (e.g. a mainframe computer). A keyboard 26 is connected to the system bus via a keyboard adapter 28. The display adapter 12 is used for controlling the display of data on a display device 30. In operation the CPU will issue commands to the display adapter over the system bus for causing it to perform display processing tasks.

The display adapter 12 illustrated in FIG. 1 includes a display memory 36 for containing information for display and logic for controlling display operations. It should be noted however, that in some prior systems, the display memory is formed by configuring part of the system RAM 16. Either way, in prior computer systems, the display memory is typically implemented using dynamic random access memory (DRAM). Existing display adapter standards such as the IBM Extended Graphics Array (EGA), or the IBM Video Graphics Array (VGA) were designed to make use of such a memory.

Figure 2:
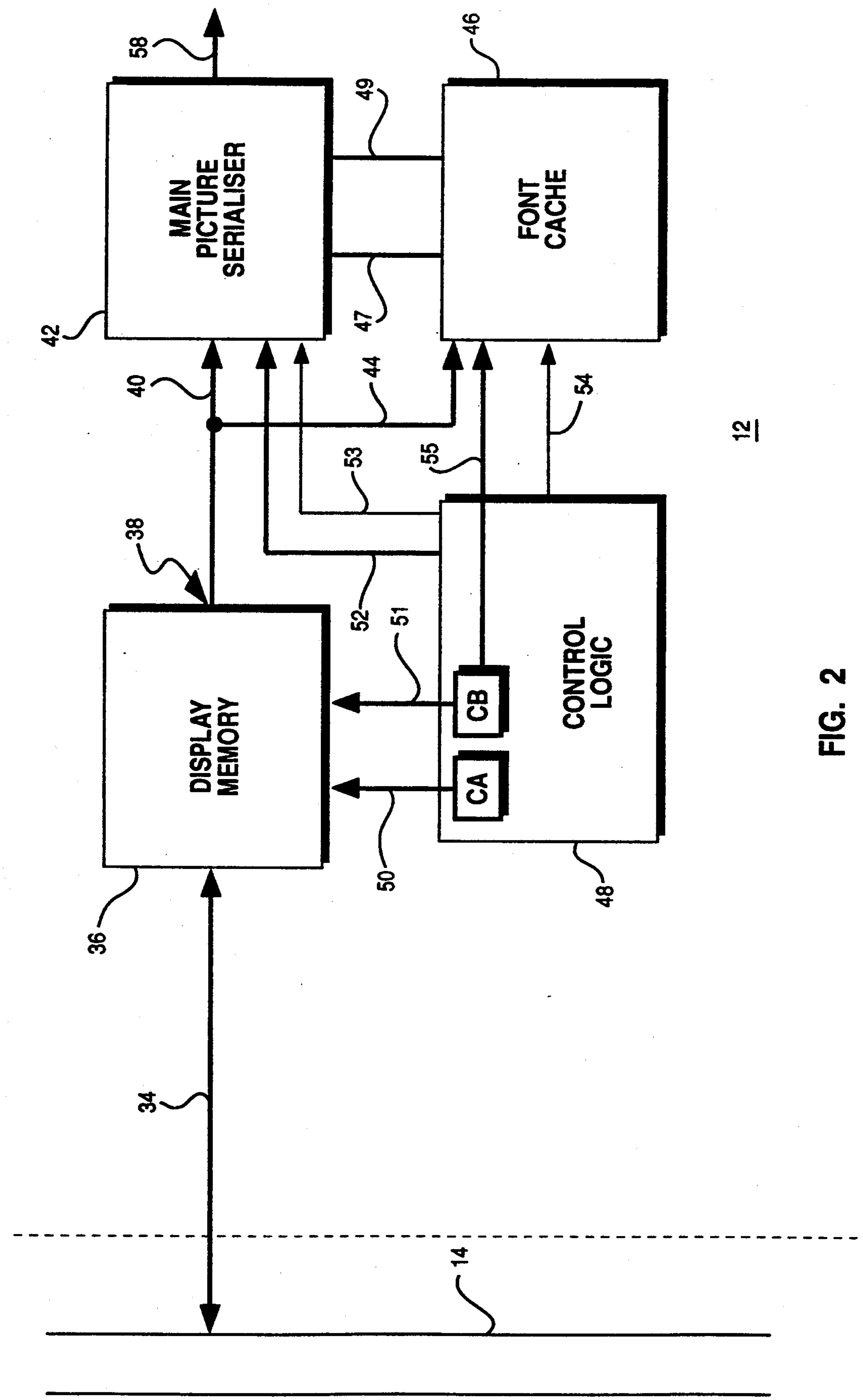
FIG. 2 is a schematic block diagram illustrating elements of a display system in accordance with the invention.

FIG. 2 is a schematic diagram of elements of a display system in accordance with the invention which is configured as a display adapter 12 to be connected to the system bus 14 of the personal computer in FIG. 1 in addition to, or as a replacement for the display adapter 12 shown in the Figure. For reasons of clarity, only those details which are needed to explain the implementation of the invention to one skilled in the art are illustrated in FIG. 2 and are described herein. For example, features which may be included, but are not described herein are buffers and/or memory control logic in the path 34 between the system bus 14 and the display memory 36 and a digital-to-analogue converter stage and possibly a colour palette between the main picture serialiser and the display device(s) being driven by the adapter.

Although a particular example of a "display system" in accordance with the invention is described herein in terms of the display adapter 12 for use in a workstation, the term "display system" as used herein is not to be limited thereto. The term "display system" is to be interpreted to cover any system which is capable of displaying information. Thus the workstation of FIG. 1, when modified to incorporate the display adapter of FIG. 2, also forms a display system in accordance with the invention. It should also be understood, that the invention is not limited to the display of information by means of a visual display monitor, but also includes the display of information by means of, for example, a printer.

The display adapter illustrated in FIG. 2 comprises a display memory (sometimes otherwise known as a refresh buffer or frame buffer) 36 composed of dual-ported memory (here dual-ported video memory, otherwise known as VRAM). The serial access port 38 of the VRAM is connected via a video path 40 to a main picture serialiser 42. Data for updating the display device are read out of the display memory via this serial port and are passed via the video path 40 to the serialiser 42. The serial output port of the display memory is also connected via an additional path 44 to a font cache 46. During periods when data is not required for updating the display, data can be passed via the additional path 44 for updating the font memory. The serialiser is able to address the font cache via address bus 47 for causing font data to be passed from the font cache to the serialiser via data path 49. Control logic 48 is provided for controlling the operation of the display adapter by means of address and control signals passed via lines 50–55.

During the vertical retrace period of the display, however, neither the VRAM nor the font RAM are accessed for the display purposes. During this time therefore, the information defining the currently displayable fonts can be accessed sequentially from the VRAM and written into the cache. The contents of the cache can thus be updated during successive vertical refresh times from the fonts stored in the VRAM. Any individual change caused by the system writing to the font area in VRAM or changing the fonts currently selected for display is reflected in the font cache within a few vertical scan periods.

In the present display adapter which is for supporting cathode ray tube type display devices, the control logic is implemented as part of the Cathode Ray Tube Controller (CRTC). In use, the CRTC causes data to be read from the display memory in synchronism with the scanning of the CRT display in accordance with the current mode of operation (APA or character mode).

Figure 3:
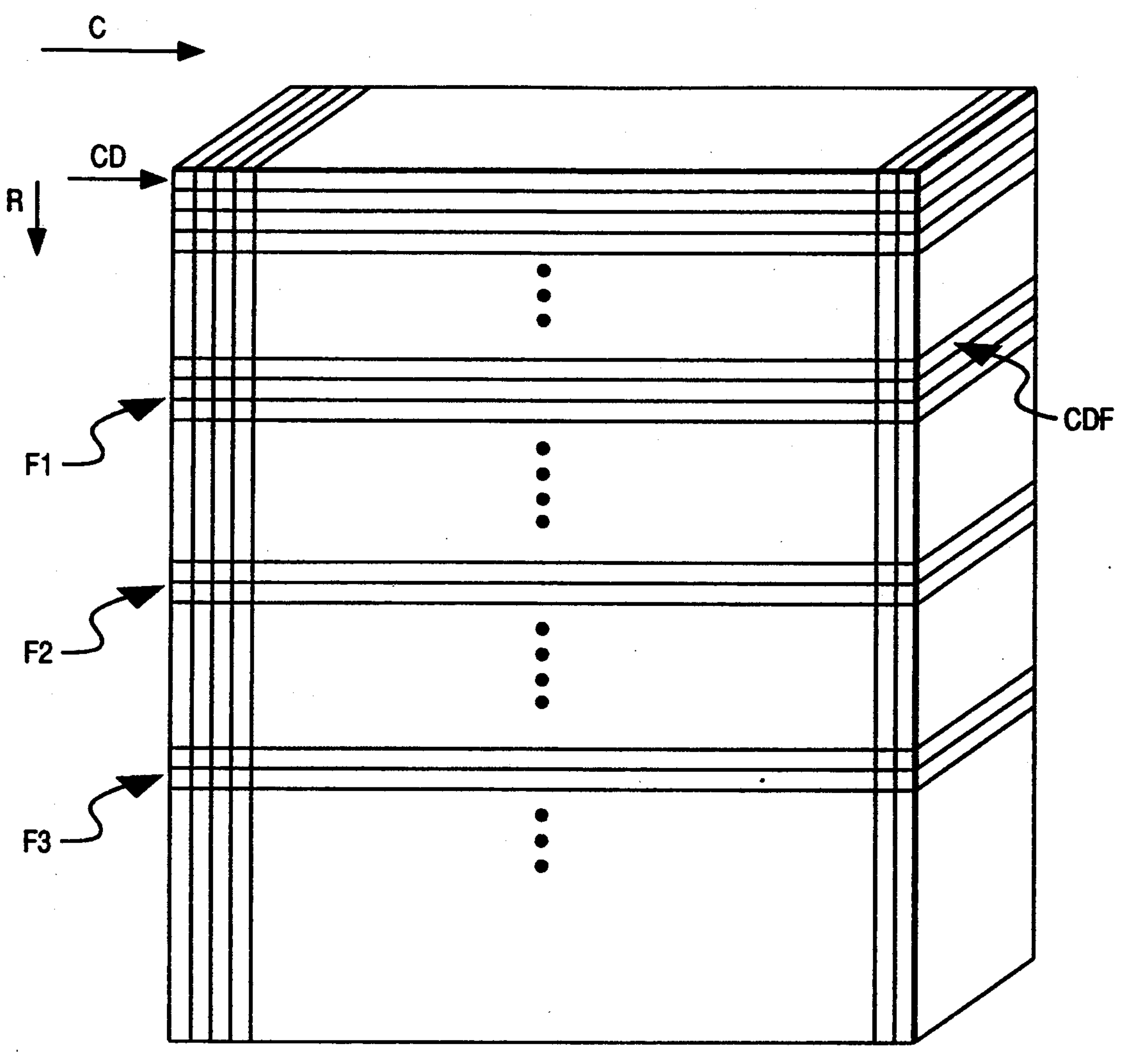
FIG. 3 a schematic representation of the content of the display memory of the display system of FIG. 2.

Before describing the operation of the display adapter under the control of the CRTC, reference is made to FIG. 3 which is a schematic illustration of the content of the display memory in a character mode. FIG. 3 represents the conceptual three dimensional structure of a VRAM. with a number (here 8) bits of data per row and column address. The VRAM memory itself is conventional in construction and operation, so this will not be described in detail. Briefly, however, the memory can be operated using the normal (DRAM type) random access port of the memory, and also using the fast serial port of the VRAM memory. In the former case, specifying a row and column address results in eight bits being output from that location via the random access port. When using the fast serial port of the VRAM however, multiple sets of eight bits for consecutive memory locations are output via the serial port starting from a selected location in memory.

The character definition information is stored in the on-screen portion of the display memory, starting at a selected location CD in the memory (here location 0.0). The "on-screen portion" of the display memory is scanned sequentially during active display times for displaying the data characters specified by the character definition information stored therein. The definitions for a number of fonts (typically eight) are also stored in the display memory, although in an off-screen portion thereof. This portion of the display memory is not scanned during active display times. The definitions for the fonts each start at a different memory location (F1, F2, F3 . . .). The font definitions represent bit maps of each of the characters of the font.

It will be apparent to one skilled in the art, that the actual font data held in the memory will depend on many factors (the actual font in question, the resolution of the display, whether anti-aliasing and/or compression techniques are employed and so on). However, each font is stored with the data defining the bit maps for respective characters of the font at successive locations in the display memory.

The character definition information for successive characters to be displayed is stored sequentially in the VRAM in which they are to appear on the display screen. In this way, during the active display scan time, the character definition information for successive characters to be displayed on each display scan line can be sequentially accessed in the VRAM.

Figure 4:
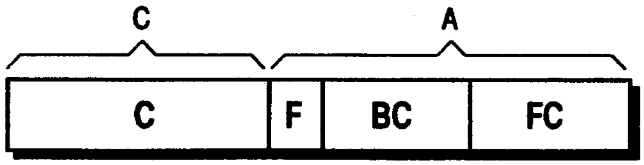
FIG. 4 illustrates a typical definition for a character for display.

A typical format for the character information for a character is illustrated in FIG. 4. It comprises a character code, C, and attribute information, A. The character code is used for specifying a particular character within a font and the attribute information selects between two fonts (bit F) and specifies the foreground (bits FC) and background (bits BC) colours.

In use, the accessing of information from the display memory is controlled by the CRTC. During active scan times the character codes and attributes are accessed sequentially from the VRAM and are passed to a serialiser. The serialiser then assembles the video information for controlling the display monitor from the character information and font information. The serialiser does not, however, take the font information directly from the display memory, rather it obtains this from the font cache.

Although the character definition information can be stored such that it may accessed from successive display memory locations during active display times, the character font information cannot be so stored. This is partly because the order in which characters are to be displayed on any particular line cannot be predicted in advance, and partly because only one line of bit map data for a character is needed for any one display line.

To illustrate this, consider a line of text to be displayed which starts with the words "In the beginning . . . ". During the active display time for scanning the first display line, the CRTC access the character codes for the characters "In the beginning . . . "from sequential display memory locations. However, assuming that the font data is stored in alphabetical order, the character dot, or pixel information for those characters will not be stored at sequential locations. Thus for successive scan lines which make up a character display line, the CRTC will cause access to the pixel information for successive lines of the bit maps for these characters in the order "In the beginning . . . ". It is assumed here that the display screen operates on a non-interleaved raster scan. For an interleaved scan, pixel data for half the scan lines need to be accessed from the font during a first scan of the display screen and pixel data for the other half of the scan lines, which are interleaved between those of the first half, need to be accessed during a second scan of the display screen.

Given the above requirements, and also that the order of the characters for display on the next line of characters will, in general, be different, it can be seen that the font information for a character mode cannot be accessed from sequential storage locations during active display times.

For each scan line of the display, the serialiser addresses the font cache via path 47 for accessing appropriate pixel information for successive characters to be displayed. The font cache addresses are generated by serialiser from the font bit F and the character code C for each character on that line as received from the display memory via path 40 (this identifies the font and character) and conventional display line count information from the CRTC via path 52 identifying the current scan line (this identifies the scan line within the character). The pixel information is passed to the serialiser via path 49 from the font cache. This pixel information effectively specifies for each pixel position on the display screen whether the background or foreground colour specified in the corresponding character attribute information is to be displayed. The serialiser uses this pixel information to gate the appropriate colour information to the output line 58 for driving the display monitor.

To obtain compatibility with existing display adapter standards, the cache has the capacity to store two complete fonts. For reasons of compatibility with other existing display standards eight fonts should be held in the display memory. For meeting these requirements, the font cache can be updated from the display memory. This takes account of the fact that, during vertical retrace neither the VRAM nor the font RAM are accessed for the display purposes. The CRTC is arranged, therefore to access the information defining the currently displayable fonts sequentially from the VRAM using the serial access port and to write this information into the cache. The contents of the cache can thus be updated during successive vertical refresh times from the fonts stored in the VRAM. In this way, any individual change caused by the system writing to the font area in VRAM or changing the fonts currently selected for display is reflected in the font cache within a few vertical scan periods. It is possible to update the font cache within this time thanks to the speed of the VRAM serial port.

The mechanism for determining the destination of the data from the display memory could take any suitable form. Here, the destination is determined by the control logic enabling the data inputs to the data serialiser and the font memory at appropriate times via control signals on control lines 53 and 54. During active display scan times the data input to the serialiser is enabled via control line 53 and the data input to the font cache disabled. At times when update information is supplied to the cache, the data input to the serialiser is disabled, the data input to the font cache is enabled via line 54 and address information is supplied to the font cache by the CRTC.

If the available bandwidth does not permit the content of the cache to be completely updated in one vertical retrace period, the CRTC needs a separate counting mechanism for addressing the display information during active display times and a second counting mechanism for addressing the font information for updating the font cache. In the embodiment illustrated in FIG. 2, the CRTC includes a first counter CA for counting from the base address CD to the final address CDF at which the character definition information is stored each time the display is refreshed. FIG. 2 represents schematically these addresses being passed via address lines 50 to the display memory. For addressing the display memory during the updating of the cache (i.e. during non active display times) the CRTC includes a second counter CB. This counter holds the position in the font reached during each burst of font data supplied during a vertical retrace time so that the updating of the font may continue from that position during the next vertical retrace time. FIG. 2 represents schematically these addresses being passed via address lines 51 to the display memory. The content of the counter CB is used by control logic in the CRTC as an index for generating not only the display memory addresses from which font data is to be read, but also the font cache addresses to which data is to be written. FIG. 2 represents schematically these addresses being passed via address lines 55 to the font cache.

The display system described above having a combination of VRAM storage for the main storage of the display information for a character mode and cache storage for the temporary storage of currently displayable font information provides the following advantages:

- all access by the host system to the character, attribute or font data can be to the VRAM which means that they can have a high performance;
- all accesses to the character or attribute data by the display system can be to the VRAM which means that they can be sequential and that high video rates may be supported;
- all accesses to the font data by the display system can be to the cache;
- only a small cache is needed which means that it may be made from high speed (static) memory and that high video rates may be supported;
- fonts and other data can be stored exactly as they were in previous adapters which means that register level compatibility can be obtained; and
- the updating of the font cache can be achieved during otherwise unused VRAM bandwidth so that system performance need not be affected.

Although a particular example of a display system has been described, it will be understood that the claimed invention is not limited thereto and many modifications and additions are possible within the scope of the claims.

For example, although the primary object of the invention is to enable a character mode to be efficiently supported on a display system having a dual-ported display memory for the storage of information to be displayed, the invention would also be applicable to display systems with display memories implemented in other memory technologies.

Also, although the font is only updated during vertical display retrace in the above example, it could be updated at any other time when display data is not required from the display memory for display purposes. For example, it could be arranged that the font cache were also updated during horizontal retrace and/or display blanking times.

We claim:

1. A display system comprising a display memory for storage of information for display on a display device, said information including a set of character font definitions, a font cache for temporary storage of definitions of one or more character fonts currently required for display and control logic for updating said font cache from said display memory.

2. A display system as claimed in claim 1 wherein said control logic is operable to update said font cache from said display memory during a blanking period of said display device.

3. A display system as claimed in claim 2 wherein said display memory is a dual-ported display memory.

4. A display stem as claimed in claim 3 wherein said font cache is high-speed static memory.

5. A display system as claimed in claim 4 wherein said font cache has capacity to contain definitions for at least two character fonts.

6. A display system as claimed in claim 5 wherein said information for display additionally comprises character codes and character attributes.

7. A display system as claimed in claim 2, wherein said control logic, during an unblanked period of said display, accesses selected character code and character attribute information from said display memory and, during said unblanked period, accesses said character font definitions from said font cache identified by said selected character code information.

8. A display system as claimed in claim 7, further comprising a serialiser which receives said character font definitions from said font cache and character attribute information from said display memory and generates a stream of display information for controlling said display of information on said display device.

9. A display system as claimed in claim 2 wherein said blanking period is a vertical retrace period of said display device.

10. A display system as claimed in claim 2 wherein said blanking period is a horizontal retrace period of said display device.

11. A method of displaying information on a display device of a display system comprising:

storing said information in a display memory, said information including at least one set of character font definitions; and temporarily storing said at least one set of character font definitions in a font cache for access by a serialiser connected to said display device.

12. A method of displaying information as claimed in claim 11 further comprising:

updating said font cache from said display memory during a blanking period of said display device.

13. A method of displaying information as claimed in claim 12, further comprising:

accessing, during an unblanked period of said display, selected character code and character attribute information from said display memory; and accessing, during said unblanked period of said display, said character font definitions from said font cache identified by said selected character code information.

14. A method of displaying information as claimed in claim 13, further comprising:

serialising said character font definitions from said font cache and character attribute information from said display memory; and generating a stream of display information for controlling said display of information on said display device.

* * * * *